(12) United States Patent
Farrar

(10) Patent No.: US 9,274,767 B2
(45) Date of Patent: Mar. 1, 2016

(54) SYSTEM AND METHOD FOR STABILITY GUARANTEES IN CONCURRENT SOFTWARE

(71) Applicant: Daniel James Farrar, Ontario (CA)

(72) Inventor: Daniel James Farrar, Ontario (CA)

(73) Assignee: IANYWHERE SOLUTIONS, INC., Dublin, CA (US)

( * ) Notice: Subject to any disclaimer, the term of this patent is extended or adjusted under 35 U.S.C. 154(b) by 20 days.

(21) Appl. No.: 13/722,601

(22) Filed: Dec. 20, 2012

(65) Prior Publication Data

US 2013/0174134 A1 Jul. 4, 2013

Related U.S. Application Data

(60) Provisional application No. 61/581,315, filed on Dec. 29, 2011, provisional application No. 61/667,309, filed on Jul. 2, 2012.

(51) Int. Cl.
*G06F 9/45* (2006.01)

(52) U.S. Cl.
CPC *G06F 8/41* (2013.01); *G06F 8/443* (2013.01); *G06F 8/458* (2013.01)

(58) Field of Classification Search
CPC ............... G06F 7/78; G06F 8/00–8/79; G06F 9/44–9/455; G06F 11/36
USPC .................................................. 717/100–178
See application file for complete search history.

(56) References Cited

U.S. PATENT DOCUMENTS

| | | | |
|---|---|---|---|
| 2005/0283781 A1* | 12/2005 | Karp et al. | 718/100 |
| 2006/0070076 A1* | 3/2006 | Ma | 718/104 |
| 2007/0022325 A1* | 1/2007 | Morizawa et al. | 714/38 |
| 2008/0005742 A1* | 1/2008 | Ma | 718/102 |
| 2009/0327997 A1* | 12/2009 | Gulwani | G06F 11/3404 717/110 |
| 2012/0030657 A1* | 2/2012 | Gao | G06F 9/524 717/128 |
| 2012/0254846 A1* | 10/2012 | Moir et al. | 717/152 |

OTHER PUBLICATIONS

Balasundaram et al., Compile-time Detection of Race Conditions in a Parallel Program, 1989.*
Suess et al., Generic Locking and Deadlock-Prevention with C++, 2007.*
Balasundaram, Compile-time Detection of Race Conditions in a Parallel Program, 1989.*
Gao et al., Resource Optimization and Deadlock Prevention while Generating Streaming Architectures from Ordinary Programs, 2011.*
Alexandrescu, A., "Multithreading and the C++ Type System," Informit.com, accessed at the world wide web informit.com/articles/printerfriendly.aspx?p=25298, accessed on Aug. 8, 2012, 8 pages (Feb. 2002).
Tov, J. and Pucella, R., "Stateful Contracts for Affine Types," *Proc. 19th European Symposium on Programming (ESOP '10)*: 550-569, Springer-Verlag, Germany (Mar. 2010).
Notification of Transmittal of the International Search Report and Written Opinion for International Application No. PCT/US2012/071309, dated Apr. 19, 2013, 9 pages.

* cited by examiner

*Primary Examiner* — Wei Zhen
*Assistant Examiner* — Zhan Chen
(74) *Attorney, Agent, or Firm* — Sterne, Kessler, Goldstein & Fox P.L.L.C.

(57) ABSTRACT

A flexible, extensible and efficient compile-time mechanism that leverages native high-level application programming language constructs (e.g., the template and macro features of C++), thus minimizing any programmer or a software developer learning curve and eliminating the need for programming tool (e.g., compiler) changes, to identify and control aspects of shared resource access in concurrent software at the time of source code compilation.

18 Claims, 2 Drawing Sheets

SYSTEM AND METHOD FOR STABILITY GUARANTEES IN CONCURRENT SOFTWARE

CROSS REFERENCE TO RELATED APPLICATIONS

This patent application claims the benefit of U.S. Provisional Patent Application Ser. No. 61/581,315, filed on 29 Dec. 2011 and U.S. Provisional Patent Application Ser. No. 61/667,309, filed on 2 Jul. 2012, which are herein incorporated by reference in their entirety.

COPYRIGHT STATEMENT

A portion of the disclosure of this patent document contains material which is subject to copyright protection. The copyright owner has no objection to the facsimile reproduction by anyone of the patent document, or the patent disclosure as it appears in the Patent and Trademark Office patent file or records, but otherwise reserves all copyright rights whatsoever.

APPENDIX DATA

Computer Program Listing Appendix under Sec. 1.52(e): This patent application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SYB11034(SrcCode01).txt, created Dec. 27, 2011, 10:53 AM, size: 19.8 KB; Object ID: File No 1; Object Contents: C++ include file source code (qproof-.hpp)-Appendix I.

Object Description: SYB11034(SrcCode01).txt, created Dec. 27, 2011, 10:24 AM, size: 6.4 KB; Object ID: File No. 2; Object Contents: C++ example application source code file (PaintColor.cpp)-Appendix II.

BACKGROUND OF THE INVENTION

1. Field of the Invention

The present invention relates generally to computer systems. More particularly, the present invention relates to ways in which access to a shared resource within a computer system may be controlled, ordered, guaranteed, etc. during an aspect of the application software development lifecycle.

2. Background of the Invention

As each day passes, the proliferation of computer-based devices progresses even further. In short, computers are everywhere—in the form of common desktop, laptop, pad and other portable systems, etc.; in servers, minicomputers, mainframes, etc.; in smartphones and other wireless devices; in televisions, television set-top boxes, Digital Video Recorders (DVRs), etc.; in appliances; in automobiles; etc.

In order for a computer to be useful, it must be appropriately directed. That direction traditionally comes through instructions in the form of a software application.

A programmer or a software developer typically creates a software application by writing source code in a high-level application programming language such as inter alia C, Java, C++, etc.

While high-level source code is easily understood by a human, it is effectively unintelligible to a computer.

Consequently source code is typically processed by a special-purpose computer program, commonly known as a compiler (i.e., the source code is compiled), to create possibly inter alia object code (i.e., instructions that can be executed by a computer).

The ever-increasing size and complexity of computer applications, the use of paradigms such as multi-threading (to for example improve performance as among other things the speed, capability, etc. of Central Processing Units (CPUs) increase), etc. lead, to a number of significant software development challenges.

One of those challenges concerns the ways in which different aspects of a software application (e.g., different functions, different threads of execution, etc.) contend over access to a shared resource such as inter alia a program variable; a memory location; a file, socket, etc. handle; a descriptor; etc.

The gravity of such contention—and the not-insignificant consequences (including inter alia the corruption of data, process or thread starvation, process or thread deadlock, etc.) when such contention is not properly managed, controlled, etc.—is readily understood by a person having ordinary skill in the relevant art. See for example Chapter 7 ("Isolation Concepts") of the classic work "Transaction Processing: Concepts and Techniques" by Gray & Reuter.

One approach to the management, control, etc. of shared resource access involves the use of an execution-time synchronization primitive such as inter alia a lock, a Mutual Exclusion (mutex) object, a semaphore, a monitor, a latch, the application of a particular lock discipline, etc.

Imagine a doctor's office, having four examining rooms. Here a semaphore, set initially to a value of four (indicating the number of empty examining rooms), could be employed to control access to the examining rooms (i.e., shared but limited resources). The value of the semaphore would be decremented by one when a patient enters an examining room and the value of the semaphore would be incremented by one when a patent exits an examining room. When the value of the semaphore reaches zero then patients would need to queue in the lobby of the doctor's office (i.e., a request for an available examining room would be blocked) until a patent leaves an examining room (and the value of the semaphore is incremented by one).

In a simpler environment, for example in a small doctor's office with just one examining room, a special case of a semaphore, with a value of one, known as a mutex could be used to serialize access to the examining room (i.e., a shared but limited resource). The mutex would ensure that only one patient gains access to the examining room at any given time, resulting in for example other patients queuing in the lobby of the doctor's office (i.e., a request for the examining room would be blocked) until the first patent leaves the examining room.

Other execution-time artifacts, beyond a semaphore and a mutex, are easily possible and indeed other numerous execution-time mechanisms have over the years been developed and employed to control access to shared resources.

While execution-time checks, controls, etc. remain important (since it is not possible to fully predict shared resource access contention, deadlocks, etc. at the time of execution), it would be desirable to provide an additional level of protection by identifying, controlling, ordering, etc. at least aspects of shared resource access at the time of source code compilation.

Thus, a need exists for a flexible, extensible, efficient, etc. compile-time mechanism that leverages native high-level application programming language constructs (such as for example the template, macro, etc. features of C++), thus minimizing any programmer or a software developer learning curve and eliminating the need for programming tool (e.g., compiler) changes, to help improve the elimination of among other things the problems of starvation and deadlock.

Aspects of the present invention fill the lacuna that was noted above while addressing, in new and innovative ways, various of the not insubstantial challenges that are associated with same.

BRIEF SUMMARY OF THE INVENTION

In one embodiment of the present invention there is provided a computer-implemented method for ensuring, during compile time, that a body of multi-threaded application source code is not susceptible to deadlock. The method includes among other things (1) identifying a plurality of shared resources within the body of multi-threaded application source code, (2) identifying a plurality of access control mechanisms for managing access to the plurality of shared resources, (3) tracking, on a detection of an object entering scope, one or more invocations of the plurality of common access mechanisms, yielding a shared resource acquisition pattern, (4) tracking, on a detection of the object leaving scope, one or more invocations of the plurality of access control mechanisms, yielding a shared resource release pattern, and (5) generating an alert when the shared resource acquisition pattern differs from the shared resource release pattern.

In another embodiment of the present invention there is provided a computer program product embodied on a computer readable medium, the computer readable medium having instructions stored thereon that when executed by a processor, cause the processor to perform a method for ensuring, at compile time, that a body of multi-threaded application source code is not susceptible to deadlock. The method includes among other things (1) identifying a plurality of shared resources within the body of multi-threaded application source code, (2) identifying a plurality of access control mechanisms for managing access to the plurality of shared resources, (3) tracking, on a detection of an object entering scope, one or more invocations of the plurality of common access mechanisms, yielding a shared resource acquisition pattern, (4) tracking, on a detection of the object leaving scope, one or more invocations of the plurality of access control mechanisms, yielding a shared resource release pattern, and (5) generating an alert when the shared resource acquisition pattern differs from the shared resource release pattern.

In yet another embodiment, a system for ensuring that a body of multi-threaded application source code is not susceptible to deadlock includes one or more processors, one or more computer readable media and computer readable instructions on the one or more computer readable media which, when executed by the one or more processors, cause the one or more processors to ensure, during compilation, that a body of multi-threaded application source code is not susceptible to deadlock, by (1) tracking, on a detection of an object entering scope, one or more invocations of a plurality of access control mechanisms, yielding a shared resource acquisition pattern, (2) tracking, on a detection of the object leaving scope, one or more invocations of the plurality of access control mechanisms, yielding a shared resource release pattern, and (3) generating an alert when the shared resource acquisition pattern differs, beyond a predetermined threshold, from the shared resource release pattern.

Further features and advantages of the present invention, as well as the structure and operation of various embodiments thereof, are described in detail below with reference to the accompanying drawings. It should be noted that the invention is not limited to the specific embodiments described herein. Such embodiments are presented herein for illustrative purposes only. Additional embodiments will be readily apparent to persons skilled in the relevant arts based on the teachings contained herein.

BRIEF DESCRIPTION OF THE DRAWINGS

The accompanying drawings, which are incorporated herein and form part of the specification, depict embodiments of the present invention and, together with the summary that was presented above and the description that may be found below, further serve to illustrate inter alia the principles, structure, and operation of such embodiments. It will be readily apparent to one of ordinary skill in the relevant art that numerous variations, modifications, alternative forms, etc. of the depicted embodiments are easily possible and indeed are within the scope of the present invention.

Figure 1:
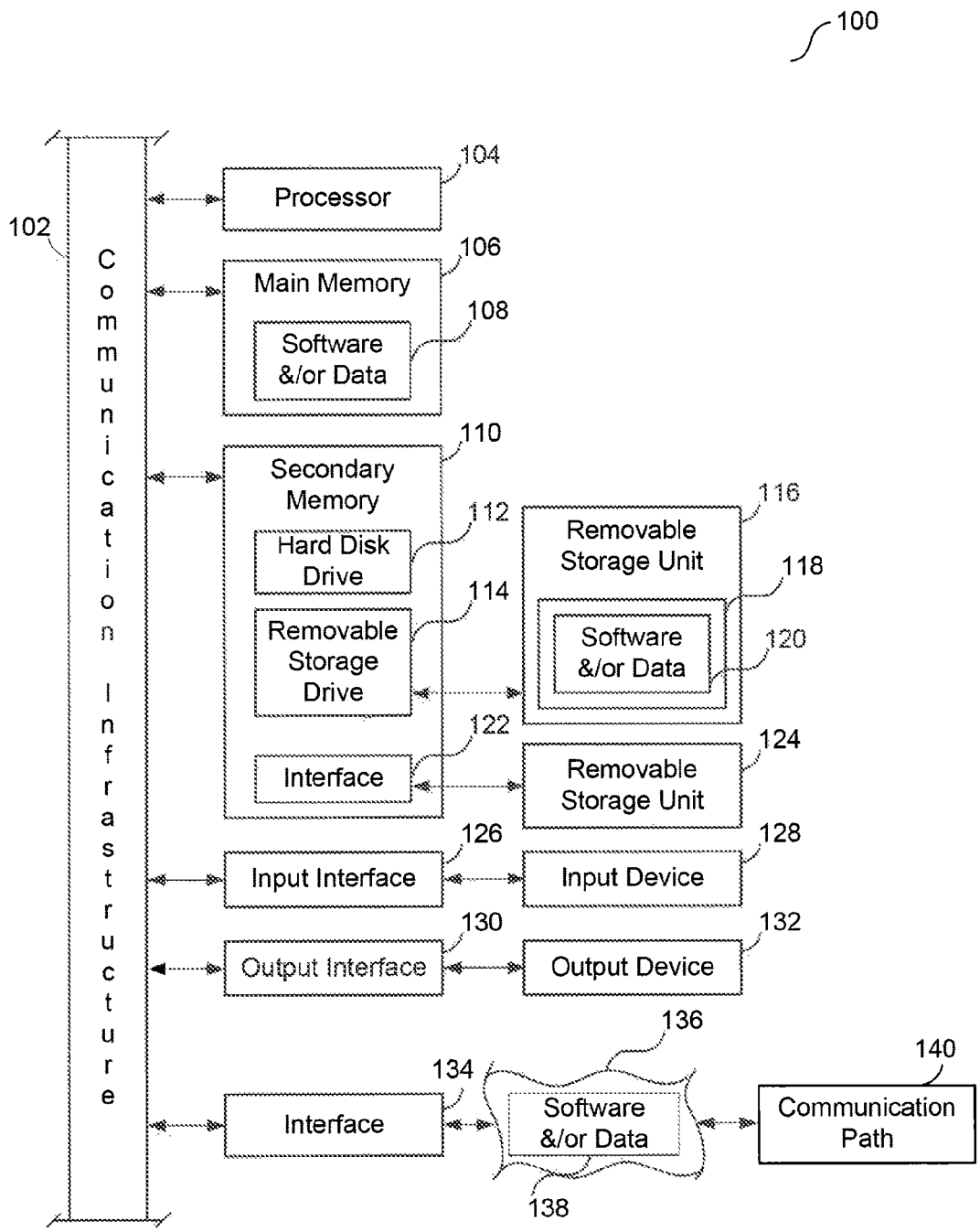
FIG. 1 depicts an exemplary computer system through which embodiments of aspects of the present invention may be implemented.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention.

Note that in this description references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art.

Various aspects of the present invention can be implemented by any combination of one or more of inter alia software, firmware, hardware, etc. For simplicity of exposition certain software application, operating system, hardware, etc. arrangements are referenced in the discussion below but it will be readily apparent to one of ordinary skill in the relevant art that the invention can work with software, firmware, hardware, etc. implementations other than those described herein. Any such implementations suitable for performing the functions described herein can be used.

FIG. 1 illustrates an example computer system 100 in which the present invention, or portions thereof, as described below can be implemented as computer-readable code. Various embodiments of the invention are described in terms of this example computer system 100. After reading this description, it will become apparent to a person skilled in the relevant art how to implement the invention using other computer systems and/or computer architectures.

Computer system 100 includes one or more processors, such as processor 104. Processor 104 can be a special purpose processor or a general purpose processor. Processor 104 is connected to a communication infrastructure 102 (for example, a bus or a network).

Computer system 100 also includes a main memory 106, preferably Random Access Memory (RAM), containing possibly inter alia computer software and/or data 108.

Computer system 100 may also include a secondary memory 110. Secondary memory 110 may include, for example, a hard disk drive 112, a removable storage drive 114, a memory stick, etc. A removable storage drive 114 may comprise a floppy disk drive, a magnetic tape drive, an optical disk drive, a flash memory, or the like. A removable storage drive 114 reads from and/or writes to a removable storage unit 116 in a well-known manner. A removable storage unit 116 may comprise a floppy disk, magnetic tape, optical disk, etc. which is read by and written to by removable storage drive 114. As will be appreciated by persons skilled in the relevant art(s) removable storage unit 116 includes a computer usable storage medium 118 having stored therein possibly inter alia computer software and/or data 120.

In alternative implementations, secondary memory 110 may include other similar means for allowing computer programs or other instructions to be loaded into computer system 100. Such means may include, for example, a removable storage unit 124 and an interface 122. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 124 and interfaces 122 which allow software and data to be transferred from the removable storage unit 124 to computer system 100.

Computer system 100 may also include an input interface 126 and a range of input devices 128 such as, possibly inter alia, a keyboard, a mouse, etc.

Computer system 100 may also include an output interface 130 and a range of output devices 132 such as, possibly inter alia, a display, one or more speakers, etc.

Computer system 100 may also include a communications interface 134. Communications interface 134 allows software and/or data 138 to be transferred between computer system 100 and external devices. Communications interface 134 may include a modem, a network interface (such as an Ethernet card), a communications port, a Personal Computer Memory Card International Association (PCMCIA) slot and card, or the like. Software and/or data 138 transferred via communications interface 134 are in the form of signals 136 which may be electronic, electromagnetic, optical, or other signals capable of being received by communications interface 134. These signals 136 are provided to communications interface 134 via a communications path 140. Communications path 140 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 116, removable storage unit 124, and a hard disk installed in hard disk drive 112. Signals carried over communications path 140 can also embody the logic described herein. Computer program medium and computer usable medium can also refer to memories, such as main memory 106 and secondary memory 110, which can be memory semiconductors (e.g. Dynamic Random Access Memory (DRAM) elements, etc.). These computer program products are means for providing software to computer system 100.

Computer programs (also called computer control logic) are stored in main memory 106 and/or secondary memory 110. Computer programs may also be received via communications interface 134. Such computer programs, when executed, enable computer system 100 to implement the present invention as discussed herein. In particular, the computer programs, when executed, enable processor 104 to implement the processes of aspects of the present invention, such as the steps, processes, actions, etc. that are discussed below. Accordingly, such computer programs represent controllers of the computer system 100. Where the invention is implemented using software, the software may be stored in a computer program product and loaded into computer system 100 using removable storage drive 114, interface 122, hard drive 112 or communications interface 134.

The invention is also directed to computer program products comprising software stored on any computer useable medium. Such software, when executed in one or more data processing devices, causes data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), nanotechnological storage device, etc.), and communication mediums (e.g., wired and wireless communications networks, local area networks, wide area networks, intranets, etc.).

Through the use of aspects of the present invention a programmer or a software developer may ensure, at compile time, that inter alia locks on a shared resource (such as for example a program variable; a memory location; a file, socket, etc. handle; a descriptor; etc.) are always acquired in a consistent order, that objects that are protected by different types of locks are accessed only when those locks are held, and that previously-acquired locks are released in a consistent order.

As noted above, the use of paradigms such as multi-threading can lead to a number of significant software development challenges including inter alia the ways in which different aspects of a software application (e.g., different functions, different threads of execution, etc.) contend over access to a shared resource such as inter alia a program variable; a memory location; a file, socket, etc. handle; a descriptor; etc.

Figure 2:
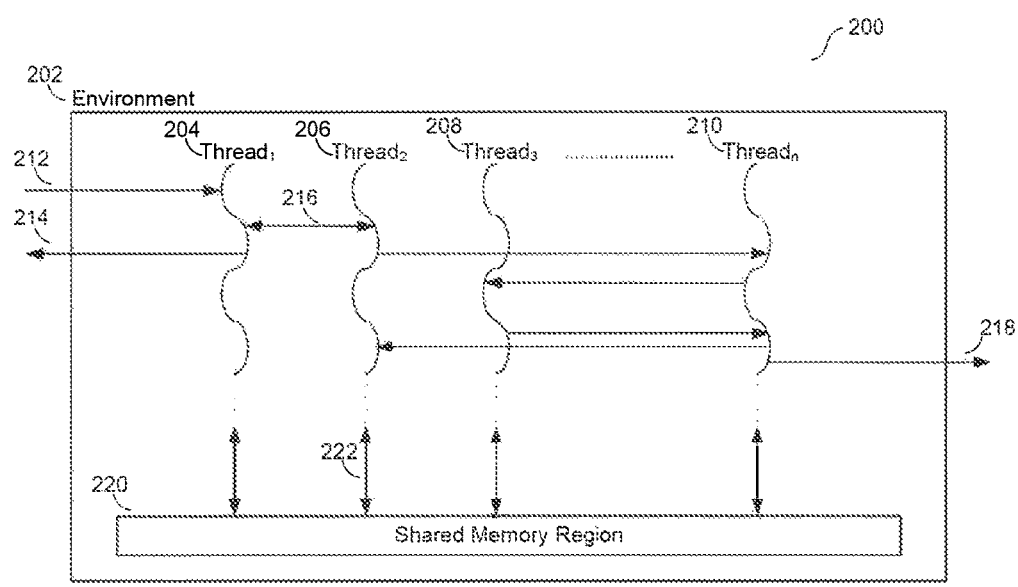
FIG. 2 depicts aspects of a hypothetical implementation that is possible under aspects of the present invention.

FIG. 2 and reference numeral 200 depict an environment 202 (e.g., implemented on or within, or containing aspects of, computer system 100 from FIG. 1) comprising possibly among other things a number of threads (including $Thread_1$ 204, $Thread_2$ 206, $Thread_3$ 208 ... $Thread_n$ 210) and a Shared Memory Region 220. Various of the threads 204 ... 210 may inter alia interact with external or outside entities (see for example 212, 214, and 218), interact with each other (see for example 216), and/or interact with a Shared Memory Region 220 (see for example 222) with any of the interactions yielding among other things contention over access to a shared resource (such as inter alia a program variable; a memory location; a file, socket, etc. handle; a descriptor; etc.).

It will be readily apparent to one of ordinary skill in the relevant art that numerous other environments, paradigms, etc. (including inter alia a single-threaded model) may also yield contention over access to a shared resource.

For simplicity of exposition the discussion that is presented below will reference one specific shared resource access control mechanism, a latch. However it will be readily apparent to one of ordinary skill in the relevant art that numerous other shared resource access control mechanisms—including inter alia a lock, a mutex, a semaphore, etc.—are easily possible and indeed are fully within the scope of the present invention.

For simplicity of exposition the discussion that is presented below will reference one specific high-level application programming language, C++. However it will be readily apparent to one of ordinary skill in the relevant art that numerous other programming paradigms—including among other things different high-level application programming languages such as for example Java, Pascal, C, etc.—are easily possible and indeed are fully within the scope of the present invention.

Aspects of the present invention provide a flexible, extensible, efficient, etc. compile-time shared resource access identification, control, ordering, etc. mechanism by leveraging native C++ constructs such as for example templates and macros. Such an approach:

1) Minimizes any programmer or a software developer learning curve. Among other things, a programmer or a software developer need not learn a new programming language, alter their programming style, etc.

2) Eliminates the need for programming tool (e.g., compiler) changes. Consequently existing, commonly-available programming tool (such as compilers) may immediately be used with aspects of the present invention.

3) Along the lines of design by contract or programming by contract, aspects of the present invention provide a form of active documentation through which various assumptions, constraints, etc. on the part of a programmer or software developer are incorporated into the application source code itself.

To help illustrate aspects of the present invention consider for a moment a hypothetical factory wherein widgets are built, painted, and boxed.

All widgets are machined in a machine room, then painted in a painting room, and finally packaged in a packaging room.

Some widgets (visible widgets) will eventually be seen by the consumer while other widgets (embedded widgets) are embedded in other products.

Some visible widgets (secret widgets) are top-secret and cannot be painted or packaged along with other products. However, if a top-secret widget is not actively being worked on it can be concealed and left in a room until it is, loaded on the truck.

Machining defects may be discovered in some widgets after painting. A widget that is so identified must be sent back to the factory to be re-machined.

Painting defects may be discovered during packaging. A widget that is so identified must be sent back to the painting room for repainting.

Embedded widgets don't have to be color-matched. Any embedded widgets that are discovered at packaging time to require repainting must be repainted to protect them, but they do not need to be painted with the exact same color that was used when they were previously painted.

Visible widgets are painted for appearance as well as protection, and must be color-matched. Any visible widgets that are discovered at packaging time to require repainting must be repainted with the same lot that was originally used to paint them (i.e. no color change can have taken place in the painting room).

The painting room must be empty when a color change takes place.

The packaging room must be empty when it is cleaned.

The illustrative C++ application source code that is contained in the attached Computer Program Listing Appendix uses aspects of the present invention to inter alia guarantee (1) that all of the conditions that were described above are met and (2) that none of the functions that implement the various steps that were described above fall susceptible to deadlock within the factory (i.e., within a WidgetFactory class). In particular:

1) The illustrative application source code that is found in qproof.hpp expresses aspects of the present invention through inter alia C++ templates and macros.

2) The illustrative application source code that is found in PaintColor.cpp implements the hypothetical factory that was described above through a WidgetFactory class with among other things various private (e.g., supportive) methods and three public methods—ManufactureObjects( ) ChangePaintColor( ) and CleanPackagingRoom( ).

Of interest and note in the illustrative application source code are, inter alia:

1) Activation of aspects of the present invention, after the qproof.hpp source file is properly included in/with an application's source code, is controlled through the definition of USE_QPROVER. For example, under normal circumstances a programmer or software developer may leave USE_QPROVER undefined. When the programmer or software developer wants to check the stability, etc. of their work they may simply define USE_QPROVER, compile all of their application source code, and observe the results. When USE_QPROVER is undefined among other things the different macros receive a minimal (e.g., non-intrusive) definition.

2) Aspects of the present invention employ two internal artifacts, a Ticket and a WaterMark (see the qproof.hpp source file).

3) Each entry point to a module, object, method, etc. that is to be protected by aspects of the present invention must create a WaterMark (e.g., the current highest type, identifier, etc. of resource obtained) through the invocation of QEntryPoint( ) See for example each of the public methods of the illustrative application source code that is found in PaintColor.cpp.

4) Shared resource access control mechanisms (such as inter alia latches) that are to be protected, monitored, etc. by aspects of the present invention must be declared through an invocation of QDeclareLatch( ) to ensure that a BaseTicket is available for a latch.

5) In function definitions a variant of QDemand( ) (i.e., QDemand0( ), QDemand1( ), QDemand2( ), etc.) is employed to specify what must be in the function caller's context. The variants of QDemand( ) all require (a) a maximum watermark level and (b) a list of (zero, one, two, etc.) latch tickets that need to be in context. See for example the different private and public methods of the illustrative application source code that is found in PaintColor.cpp.

6) A caller of a function may demonstrate that the requirements that are appropriate to the function are met by supplying (a) a watermark and (b) an appropriate set of tickets through a variant of QProve( ) (i.e., QProve0( ), QProve1( ), QProve2( ), etc.). See for example various of the private and public methods of the illustrative application source code that is found in PaintColor.cpp.

7) A variant of QUnused( ) (i.e., QUnused0( ), QUnused1( ), QUnused2( ), etc.) may be employed, as needed, to for example suppress, eliminate, etc. compiler strictness, etc. warnings. See for example various of the private and public methods of the illustrative application source code that is found in PaintColor.cpp.

8) It will be readily apparent to one of ordinary skill in the relevant art that additional variants of different of the macros, functions, methods, etc. that were described above—including inter alia QDemand( ), QUnused( ), and QProve( )—may be easily added, defined, etc. as appropriate and as needed.

9) A set of macros, QShared*( ) and QExclusive*( ) (see the qproof.hpp source file for exemplary definitions and various of the private and public methods of the illustrative application source code that is found in PaintColor.cpp for exemplary use), support the acquisition, release, etc. of a shared resource access control mechanism (in the instant example a latch). For example:

A) QSharedSteadfast( ) acquires a latch in shared mode, with the proviso that the latch may never be released until its final release (i.e., it is 'steadfast').

B) The QSharedRelinquishable*( ) macros acquire a latch in shared mode, with the proviso that such a latch may later be given up as long as it can be reacquired.

C) The QExclusive*( ) macros provide exclusive equivalents of the QShared*( ) macros.

D) QRelinquishedTo( ) temporarily releases a relinquishable latch.

E) QUpgradedToExclusive( ) and QDowngradedToShared( ) allow for the temporary change of latch type.

The paradigm that was described above may be realized through any number of application programming languages such as for example C++. Under such a realization, possibly inter alia:

1) As an object comes in to or enters scope among other things a range of Ticket, WaterMark, etc. entry or setup operations, resource acquisition operations, etc. may be completed (through for example functions, routines, etc. such as QEntryPoint( ) or other blocks, sequences, etc. of application source code) through inter alia the invocation of one or more constructor functions.

2) As an object goes out of or leaves scope among other things a range of Ticket, WaterMark, etc. exit or cleanup operations, resource release operations, etc. may be completed through inter alia the invocation of one or more destructor functions.

It is important to note that the hypothetical examples that were presented above, which were described in the narrative and which were illustrated in the accompanying figures, are exemplary only. They are not intended to be exhaustive or to limit the invention to the specific forms disclosed. It will be readily apparent to one of ordinary skill in the relevant art that numerous alternatives to the presented examples are easily possible and, indeed, are fully within the scope of the present invention.

What is claimed is:

1. A computer-implemented method for ensuring, during compilation, that a body of multi-threaded application source code is not susceptible to deadlock, the method comprising:
identifying a plurality of shared resources within the body of multi-threaded application source code;
identifying, during the compilation and before execution of the source code, a plurality of access control mechanisms for managing access to the plurality of shared resources, wherein the plurality of access control mechanisms include both a first access control mechanism for managing access to a first one of the plurality of shared resources, and a second access control mechanism for managing access to a second one of the plurality of shared resources, wherein the second access control mechanism is different from the first access control mechanism;
tracking, on a detection of an object entering scope, one or more invocations of the plurality of access control mechanisms, yielding a shared resource acquisition pattern;
tracking, during the compilation, on a detection of the object leaving scope, one or more invocations of the plurality of access control mechanisms, yielding a shared resource release pattern;
determining whether the shared resource acquisition pattern differs from the shared resource release pattern beyond a predetermined threshold; and
generating, during the compilation, an alert if the predetermined threshold is exceeded.

2. The method of claim 1, wherein the plurality of access control mechanisms encompass operation of two or more of a lock, a mutex, a semaphore, a monitor, and a latch.

3. The method of claim 1, wherein the tracking steps and the generating step employ a type system of a programming language of the multi-threaded application source code.

4. The method of claim 1, wherein the tracking steps and the generating step employ one or more of a template and a macro.

5. The method of claim 1, wherein the first access control mechanism is a latch.

6. The method of claim 5, wherein the second access control mechanism is a semaphore.

7. The method of claim 1, wherein each access control mechanism is associated with a request for one of the plurality of shared resources and a releasing of the requested resource.

8. A computer program product embodied on a non-transitory computer readable medium, the computer readable medium having instructions stored thereon that when executed by a processor, cause the processor to perform operations to ensure, during compilation, that a body of multi-threaded application source code is not susceptible to deadlock, the operations comprising:
identifying a plurality of shared resources within the body of multi-threaded application source code;
identifying, during the compilation and before execution of the source code, a plurality of access control mechanisms for managing access to the plurality of shared resources, wherein the plurality of access control mechanisms include both a first access control mechanism for managing access to a first one of the plurality of shared resources, and a second access control mechanism for managing access to a second one of the plurality of shared resources, wherein the second access control mechanism is different from the first access control mechanism;
tracking, on a detection of an object entering scope, one or more invocations of the plurality of access control mechanisms, yielding a shared resource acquisition pattern;
tracking, during the compilation, on a detection of the object leaving scope, one or more invocations of the plurality of access control mechanisms, yielding a shared resource release pattern; and
determining whether the shared resource acquisition pattern differs from the shared resource release pattern beyond a predetermined threshold; and
generating, during the compilation, an alert if the predetermined threshold is exceeded.

9. The computer readable medium of claim 8, wherein the plurality of access control mechanisms encompass operation of two or more of a lock, a mutex, a semaphore, a monitor, and a latch.

10. The computer readable medium of claim 8, wherein the tracking steps and the generating step employ a type system of a programming language of the multi-threaded application source code.

11. The computer readable medium of claim 8, wherein the tracking steps and the generating step employ one or more of a template and a macro.

12. A system for ensuring that a body of multi-threaded application source code is not susceptible to deadlock, the system comprising:
one or more processors;
one or more computer readable media; and
computer readable instructions on the one or more computer readable media which, when executed by the one or more processors, cause the one or more processors to ensure, during compilation and before execution, that a body of multi-threaded application source code is not susceptible to deadlock, by at least:
tracking, on a detection of an object entering scope, one or more invocations of a plurality of access control mechanisms, yielding a shared resource acquisition pattern, wherein the plurality of access control mechanisms include both a first access control mechanism for managing access to a first one of the plurality of shared resources, and a second access control mechanism for managing access to a second one of the plurality of shared resources, wherein the second access control mechanism is different from the first access control mechanism;
tracking, during the compilation, on a detection of the object leaving scope, one or more invocations of the plurality of access control mechanisms, yielding a shared resource release pattern; and
determining whether the shared resource acquisition pattern differs from the shared resource release pattern beyond a predetermined threshold; and
generating, during the compilation, an alert if the predetermined threshold is exceeded.

13. The system of claim 12, wherein the plurality of access control mechanisms encompass operation of two or more of a lock, a mutex, a semaphore, a monitor, and a latch.

14. The system of claim 12, wherein the tracking steps and the generating step employ a type system of a programming language of the multi-threaded application source code.

15. The system of claim 12, wherein the tracking steps and the generating step employ one or more of a template and a macro.

16. The method of claim 1, wherein the source code is C++.

17. The method of claim 1, wherein at least one of the shared resources is a memory location.

18. The method of claim 1, wherein the generating comprises generating the alert when a lock on the shared resource is released in an order inconsistent with an order corresponding to an acquisition of the lock.

* * * * *